United States Patent
Tang et al.

(10) Patent No.: US 8,174,777 B2
(45) Date of Patent: May 8, 2012

(54) ZOOM LENS ASSEMBLY

(75) Inventors: Hsiang Chi Tang, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 251 days.

(21) Appl. No.: 12/780,351

(22) Filed: May 14, 2010

(65) Prior Publication Data

US 2011/0205635 A1     Aug. 25, 2011

(30) Foreign Application Priority Data

Feb. 23, 2010    (TW) ................................ 99105209 A (51) Int. Cl.
    *G02B 9/12*      (2006.01)
(52) U.S. Cl. ........................................................ 359/784
(58) Field of Classification Search .................. 359/716, 359/740, 784
See application file for complete search history.

(56) References Cited

U.S. PATENT DOCUMENTS 6,977,778 B2 * 12/2005 Nose et al. .................... 359/680

* cited by examiner

*Primary Examiner* — Joseph P Martinez
(74) *Attorney, Agent, or Firm* — Morrison Manning & Martin LLP; Tim Tingkang Xia, Esq.

(57) ABSTRACT

This invention provides a zoom lens assembly in order from an object side toward an image side including a first lens group with negative refractive power, a second lens group with positive refractive power and a third lens group with positive refractive power. The first lens group has only two lenses with refractive power from an object side toward an image side in order including a first lens with negative refractive power and a second lens with negative refractive power. The second lens group from an object side toward an image side in order includes an aperture stop, a third lens and a fourth lens. The third lens group includes a fifth lens. The number of the lens with refractive power in the zoom lens assembly is N, which satisfies the condition of $5 \leq N \leq 7$, and the lens with refractive power in the zoom lens assembly includes at least three aspheric-surface lens.

20 Claims, 13 Drawing Sheets

Wide Angle Mode

Telephoto Mode

Wide Angle Mode

Wide Angle Mode

Fig. 3B

Telephoto Mode

Wide Angle Mode

TABLE 1

| (Embodiment 1) | | | | | | |
|---|---|---|---|---|---|---|
| f = 3.18(W); 4.37(T) mm, Fno = 2.10(W); 2.55(T), HFOV = 37.6(W); 27.9(T) deg. | | | | | | |
| Surface # | | Curvature Radius | Thickness | Material | Index | Abbe # | Focal length |
| 0 | Object | Plano | Infinity | | | | |
| 1 | Lens 1 | 49.80010 | 1.160 | Glass | 1.487 | 70.2 | -12.84 |
| 2 | | 5.51630 | 2.538 | | | | |
| 3 | | Plano | -1.258 | | | | |
| 4 | Lens 2 | 5.85200 (ASP) | 2.405 | Plastic | 1.530 | 55.8 | -40.9 |
| 5 | | 3.95200 (ASP) | 11.155(W); 9.008(T) | | | | |
| 6 | Ape. Stop | Plano | -0.143 | | | | |
| 7 | Lens 3 | 2.58177 (ASP) | 3.100 | Plastic | 1.543 | 56.5 | 3.38 |
| 8 | | -3.68380 (ASP) | -0.157 | | | | |
| 9 | | Plano | 0.664 | | | | |
| 10 | Lens 4 | -3.50570 (ASP) | 0.574 | Plastic | 1.632 | 23.4 | -2.51 |
| 11 | | 3.07610 (ASP) | 0.730(W); 2.878(T) | | | | |
| 12 | Lens 5 | 12.67940 (ASP) | 2.850 | Plastic | 1.530 | 55.8 | 4.93 |
| 13 | | -3.03590 (ASP) | 0.500 | | | | |
| 14 | IR-filter | Plano | 0.500 | Glass | 1.517 | 64.2 | - |
| 15 | | Plano | 0.350 | | | | |
| 16 | Cover-glass | Plano | 0.500 | Glass | 1.517 | 64.2 | - |
| 17 | | Plano | 0.743 | | | | |
| 18 | Image | Plano | | | | | |
| Note: Clear aperture diameter on surface #3 is 9.00mm | | | | | | |
| Clear aperture diameter on surface #6 is 3.66mm | | | | | | |
| Clear aperture diameter on surface #9 is 2.78mm | | | | | | |

Fig. 5

| TABLE 2 | | | | |
|---|---|---|---|---|
| Aspheric Coefficients | | | | |
| Surface # | 4 | 5 | 7 | 8 |
| k = | -2.33931E+00 | -3.90699E-01 | -2.64460E+00 | -1.44159E+01 |
| A4 = | 1.73082E-04 | -3.98229E-03 | 1.60928E-02 | 1.80873E-03 |
| A6 = | -9.96225E-05 | -1.13700E-04 | -5.73227E-04 | 1.35018E-03 |
| A8 = | 3.98771E-06 | 8.31825E-06 | | -2.61681E-03 |
| A10= | | | | 5.46210E-04 |
| Surface # | 10 | 11 | 12 | 13 |
| k = | -1.62819E+01 | -6.74809E-02 | -4.94134E+01 | -2.45345E+00 |
| A4 = | -2.37555E-03 | 9.82505E-03 | -1.80136E-03 | -5.74363E-04 |
| A6 = | -2.33414E-02 | -1.78683E-02 | -3.84377E-04 | -1.03363E-03 |
| A8 = | 6.33826E-03 | 6.97064E-03 | -1.40309E-05 | 1.09042E-04 |
| A10= | -8.34826E-04 | -8.41707E-04 | -1.84943E-06 | -6.46618E-06 |

Fig. 6

| TABLE 3 | | | | | | | |
|---|---|---|---|---|---|---|---|
| (Embodiment 2) | | | | | | | |
| f = 3.20(W); 4.31(T) mm, Fno = 2.35(W); 2.85(T), HFOV = 36.6(W); 28.3(T) deg. | | | | | | | |
| Surface # | | Curvature Radius | Thickness | Material | Index | Abbe # | Focal length |
| 0 | Object | Plano | Infinity | | | | |
| 1 | Lens 1 | 20.35050 | 1.300 | Glass | 1.487 | 70.2 | -12.84 |
| 2 | | 5.84400 | 1.247 | | | | |
| 3 | Lens 2 | 5.96930 (ASP) | 2.093 | Plastic | 1.530 | 55.8 | -40.9 |
| 4 | | 3.40870 (ASP) | 11.087(W); 9.184(T) | | | | |
| 5 | Ape. Stop | Plano | -0.407 | | | | |
| 6 | Lens 3 | 2.63460 (ASP) | 3.100 | Plastic | 1.543 | 56.5 | 3.38 |
| 7 | | -2.97219 (ASP) | 0.446 | | | | |
| 8 | Lens 4 | -3.59260 (ASP) | 0.825 | Plastic | 1.632 | 23.4 | -2.51 |
| 9 | | 2.53574 (ASP) | 0.944(W); 2.847(T) | | | | |
| 10 | Lens 5 | 5.54540 (ASP) | 2.136 | Plastic | 1.530 | 55.8 | 4.93 |
| 11 | | -3.89810 (ASP) | 0.500 | | | | |
| 12 | IR-filter | Plano | 0.500 | Glass | 1.517 | 64.2 | - |
| 13 | | Plano | 0.350 | | | | |
| 14 | Cover-glass | Plano | 0.500 | Glass | 1.517 | 64.2 | - |
| 15 | | Plano | 0.441 | | | | |
| 16 | Image | Plano | | | | | |
| Note: Clear aperture diameter on surface #5 is 3.20mm | | | | | | | |

Fig. 7

| TABLE 4 | | | | |
|---|---|---|---|---|
| Aspheric Coefficients | | | | |
| Surface # | 3 | 4 | 6 | 7 |
| k = | -3.27477E+00 | -3.69551E-01 | -2.20012E+00 | -1.23072E+01 |
| A4 = | 4.13507E-04 | -4.04257E-03 | 1.26137E-02 | -1.46830E-03 |
| A6 = | -8.14676E-05 | -1.22316E-04 | -2.18012E-04 | 7.08908E-04 |
| A8 = | 4.08202E-06 | 9.26621E-06 | -1.45901E-05 | -1.80791E-03 |
| A10= | -2.99298E-08 | -1.10788E-07 | -9.89026E-06 | 2.35969E-04 |
| Surface # | 8 | 9 | 10 | 11 |
| k = | -2.08341E+01 | -8.43285E-01 | -1.33046E-01 | -6.18984E+00 |
| A4 = | -6.00997E-03 | 3.07405E-03 | 5.02292E-04 | -3.76233E-05 |
| A6 = | -2.32627E-02 | -1.74837E-02 | -5.00363E-04 | -5.48660E-04 |
| A8 = | 6.62697E-03 | 7.67610E-03 | 7.39738E-05 | 8.65482E-05 |
| A10= | -1.36372E-03 | -1.13143E-03 | -5.50512E-06 | -6.06380E-06 |

Fig. 8

| TABLE 5 | | |
|---|---|---|
| | Embodiment 1 | Embodiment 2 |
| f | 3.18(W); 4.37(T) | 3.20(W); 4.31(T) |
| Fno | 2.10(W); 2.55(T) | 2.35(W); 2.85(T) |
| HFOV | 37.6(W); 27.9(T) | 36.6(W); 28.3(T) |
| $f_W$ | 3.18 | 3.20 |
| V4 | 23.4 | 23.4 |
| V3-V4 | 33.1 | 33.1 |
| $f_W/f_{G2}$ | 0.47 | 0.49 |
| $f_W/f_{G3}$ | 0.65 | 0.66 |
| $f_W/f_2$ | -0.08 | -0.15 |
| $f_W/f_3$ | 0.94 | 1.00 |
| $f_{G2}/f_{G3}$ | 1.38 | 1.35 |
| R5/R6 | -0.70 | -0.89 |
| R9/R10 | -4.18 | -1.42 |
| N | 5 | 5 |
| $Fno_W$ | 2.10 | 2.35 |
| $BFL_W/BFL_T$ | 1.0 | 1.0 |
| $TTL_W/TTL_T$ | 1.0 | 1.0 |
| $TTL_W/ImgH$ | 10.8 | 10.3 |
| Note: W denotes Wide Angle, T denotes Telephoto | | |

Fig. 9

ZOOM LENS ASSEMBLY

BACKGROUND OF THE INVENTION

1. Field of the Invention

The present invention relates to a zoom lens assembly, and more particularly, to a compact zoom lens assembly used in a portable electronic device.

2. Description of the Prior Art

In recent years, with the popularity of mobile phone cameras, the demand for compact imaging lenses is increasing, and the sensor of a general photographing camera is none other than CCD (charge coupled device) or CMOS (Complementary Metal-Oxide Semiconductor Sensor). Furthermore, as advanced semiconductor manufacturing technology has allowed the pixel size of sensors to be reduced and electronic devices have become more compact and powerful, there is an increasing demand for compact imaging lenses featuring better image quality.

A conventional compact imaging lens generally adopts a single focus design which is manufactured by a relatively simpler and more cost effective process. However, single focus imaging lens is unable to simultaneously satisfy the needs of magnification when shooting images from afar and enlarged view angles when shooting images at close range, causing inconvenience for users and requiring users to carry multiple lenses for photo taking at distant and close range. In order to satisfy the needs of photo shooting at both close and distant range, imaging lenses with zoom functionality has become a development trend for high level imaging modules. On top of superior functionalities and compact sizes of the modern electronics, high performance compact imaging lens with zoom functionality has become an essential element of high level electronics.

Therefore, a need exists in the art for a zoom lens assembly that features better image quality, maintains a moderate total track length and is applicable to compact portable electronic products.

SUMMARY OF THE INVENTION

The present invention provides a zoom lens assembly comprising, in order from an object side to an image side: a negative first lens group, a positive second lens group, and a positive third lens group wherein there are only two lenses with refractive power within the first lens group, which comprises, in order from the object side to the image side, a negative first lens element and a negative second lens element; the second lens group comprises, in order from the object side to the image side, a stop, a third lens element, and a fourth lens element; the third lens group comprises, a fifth lens element; wherein the number of lenses with refractive power in the zoom lens is N, and it satisfies the relation: $5 \leq N \leq 7$, wherein there are at least three aspheric lenses among the lenses with refractive power of the zoom lens assembly.

In the present invention, having such arrangement of aforementioned lens groups, it can effectively reduce the total track length of the lens assembly, improve image quality, and can provide excellent zoom functionality.

In the present zoom lens assembly, the first lens group having negative refractive power is beneficial for increasing the view angle of the zoom lens assembly in wide angle mode, and both the first, second lenses being negative, while increasing the view angle of the lens assembly, refractive power is distributed among the first and the second lenses, preventing any single lens having too much refractive power, effectively reducing aberrations in the system, and improving the image quality; wherein the second lens group having positive power, and by the second lens group moving upward along the optical axis, zooming between the wide angle side and the telephoto side can be achieved, and when the third lens being positive and providing the main refractive power in the system, the total track length of the zoom lens assembly can be effectively reduced, wherein the fourth lens being negative helps correct the chromatic aberrations of the system; wherein the third lens group being positive can effectively distribute the refractive power of the second lens group. Besides distributing the refractive power of the second lens group, the light entry angle of the photo sensing element is effectively suppressed in order to improve the sensitivity of the assembly.

In the present zoom lens assembly, when the first lens element is a meniscus lens with convex object side and concave image side surfaces, and the second lens element is a meniscus lens with convex object side and concave image side surfaces, the view angle of the wide angle side of the zoom lens assembly can be increased, and having moderate incident light refraction can avoid overly increasing aberrations, thus more beneficial in obtaining a good balance between increasing the view angle of the assembly and correcting aberrations. When the third lens is bi-convex, the distribution of refractive power of the second lens group is strengthened, the total track length of the assembly and the displacement of the second lens group while zooming are effectively reduced, in order to maintain the compact size of the zoom lens assembly.

When the fourth lens is bi-convex, the ability in correcting chromatic aberrations of the assembly is strengthened.

DETAILED DESCRIPTION OF THE PREFERRED EMBODIMENTS

The present invention provides a zoom lens assembly comprising, in order from an object side to an image side: a negative first lens group, a positive second lens group, and a positive third lens group, wherein the first lens group only has two lens elements with refractive power, comprises, in order from the object side to the image side: a negative first lens element and a negative second lens element; the second lens group comprises, in order from the object side to the image side: a stop, a third lens element and a fourth lens element; the third lens group comprises a fifth lens element; wherein the number of lens element with refractive power in the zoom lens assembly is N, and it satisfies the relation: $5 \leq N \leq 7$, and the lens elements with refractive power of the zoom lens assembly at least include three aspheric lens elements.

When the present zoom lens assembly satisfies the following relation: $5 \leq N \leq 7$, by controlling the numbers of lens elements in the assembly, a good balance between reducing the total track length of the assembly and increasing the image quality can be obtained, which also help control the manufacturing process and costs. In the aforementioned zoom lens assembly, it is preferable that at least three of the lens elements with refractive power are aspheric. Aspheric surfaces can be easily made into non-spherical profiles, allowing more design parameter freedom which can be used to reduce aberrations and the number of the lens elements, so that the total track length of the photographing lens system can be effectively reduced.

In the aforementioned zoom lens assembly of the present invention, the focal length of the zoom lens assembly in wide angle mode is $f_W$, the focal length of the second lens element is f2, and preferably, they satisfy the relation: $-0.30 < f_W/f2 < -0.03$. When $f_W/f2$ satisfies the previous relation, it helps that while increasing the view angle of the zoom lens assembly, the distribution of refractive power between the first lens element and the second lens element is more balanced, preventing either lens element having too much refractive power and too much aberration generated within the assembly, in order to improve the image quality; furthermore, preferably it satisfies the relation: $-0.18 < f_W/f2 < -0.06$.

In the aforementioned zoom lens assembly of the present invention, the focal length of the zoom lens assembly in wide angle mode is $f_W$, the focal length of the second lens group is $f_{G2}$, and preferably, they satisfy the relation: $0.35 < f_W/f_{G2} < 0.65$. When $f_W/f_{G2}$ satisfies the previous relation, the distribution of refractive power of the second lens group is better, the total track length of the lens assembly and the displacement required while zooming of the second lens group are effectively reduced, the lens assembly is able to maintain its compact size, and it prevents the second lens group having too much refractive power, further reducing the sensitivity of the lens assembly.

In the aforementioned zoom lens assembly of the present invention, the focal length of the second lens group is $f_{G2}$, the focal length of the third lens group is $f_{G3}$, and preferably, they satisfy the relation: $0.90 < f_{G2}/f_{G3} < 1.50$. When $f_{G2}/f_{G3}$ satisfies the previous relation, the distribution of refractive power of the second lens group and the third lens group is more balanced. It helps reduce the sensitivity of the zoom lens assembly from manufacturing assembly error (such as decenter) and environmental change (such as temperature), in order to increase the manufacturing yield of the zoom lens assembly of the present invention; moreover, it preferably satisfies the relation: $1.20 < f_{G2}/f_{G3} < 1.50$.

In the aforementioned zoom lens assembly of the present invention, the focal length of the zoom lens assembly in wide angle mode is $f_W$, the focal length of the third lens element is f3, preferably, they satisfy the relation: $0.80 < f_W/f3 < 1.10$. When $f_W/f3$ satisfies the previous relation, it helps reduce the total track length of the assembly and the displacement required for the second lens group while zooming. It also keeps the lens assembly being compact and prevents generating too much high order aberrations.

In the aforementioned zoom lens assembly of the present invention, the Abbe number of the third lens element is V3, the Abbe number of the fourth lens element is V4, and preferably, they satisfy the relation: $30.5 < V3 - V4 < 42.0$; $V4 < 25.0$. When V3 and V4 satisfy the previous relation, it helps the lens assembly to reinforce its ability to correct chromatic aberrations, in order to improve the resolution of the lens assembly.

In the aforementioned zoom lens assembly of the present invention, the focal length of the zoom lens assembly in wide angle mode is $f_W$, the focal length of the third lens group is $f_{G3}$, and preferably, they satisfy the relation: $0.55 < f_W/f_{G3} < 0.75$. When $f_W/f_{G3}$ satisfies the previous relation, the distribution of refractive power of the third lens group is more balanced, which helps control the refractive power of the second group with itself not having to much refractive power. It also reduces the sensitivity of the assembly, effectively controls the angle of incident light projected onto the sensor, and improves the sensitivity of the sensor.

In the aforementioned zoom lens assembly of the present invention, preferably, the only lens element with refractive power in the third lens group should be the fifth lens element. The radius of curvature on the object-side surface of the fifth lens element is R9, the radius of curvature on the image-side surface of the fifth lens element is R10, and they satisfy the relation: $-6.0 < R9/R10 < -1.2$. When R9/R10 satisfy the previous relation, the astigmatism and distortion of the lens assembly can be favorably corrected, and at the same time, the incident light angle projected onto the photo sensor is effectively suppressed, and the response sensitivity of the photo sensor is improved.

In the aforementioned zoom lens assembly of the present invention, additional photo sensor is set up at the imaging plane for object images. The total optical track length of the zoom lens assembly is TTL, which includes the total optical length $TTL_W$ while operating in wide angle mode and the total optical length $TTL_T$ while operating in telephoto mode, is defined as the distance near the optical axis from the object-side surface of the first lens element to the electric photo sensor, and the maximum image height of the zoom lens assembly is ImgH, which is defined as half of the diagonal line of the effective pixel area of the electric photo sensor, and preferably, they satisfy the relation: $TTL_W/ImgH < 12.0$. When $TTL_W/ImgH$ satisfy the previous relation, it is favorable in maintaining the compactness of the zoom lens assembly for mobile electronics applications.

In the aforementioned zoom lens assembly of the present invention, the total optical length while operating in wide angle mode is $TTL_W$, the total optical length while operating in telephoto mode is $TTL_T$, and the back focal length of the zoom lens assembly is BFL, which includes the back focal length $BFL_W$ while operating in wide angle mode and the back focal length $BFL_T$ while operating in telephoto mode, is defined as the distance near the optical axis from the image-side surface of the lens element, with refractive power and closest to the image plane, of the zoom lens assembly, to the aforementioned electric photo sensor, and preferably, they satisfy the relations: $0.99 < TTL_W/TTL_T < 1.01$; $0.99 < BFL_W/BFL_T < 1.01$. When $TTL_W/TTL_T$ and $BFL_W/BFL_T$ satisfy the previous relations, while the zoom lens assembly operates in wide angle mode and in telephoto mode, the total optical track length and the back focal length remain constant, thus simplifying the zooming structure of the assembly, in order to achieve reduced lens assembly size and lower production costs.

In the aforementioned zoom lens assembly of the present invention, the f-number in wide angle mode is $Fno_W$, and preferably, it satisfies the relation: $1.60 < Fno_W < 2.40$. When $Fno_W$ satisfies the previous relation, it allows the zoom lens assembly to obtain a proper aperture for sufficient incoming light, increases the light sensitivity of the assembly while in low light condition, lowers the response time of the photo sensor, avoids the possibility of having blurred images due to vibration under long time exposure, and increases the performance of photo imaging while in motion.

In the aforementioned zoom lens assembly of the present invention, the radius of curvature of the object-side surface of the third lens element is R5, the radius of curvature of the image-side surface of the third lens element is R6, and preferably, they satisfy the relation: $-1.0 < R5/R6 < -0.60$. When R5/R6 satisfies the previous relation, the zoom lens assembly can favorably correct its spherical aberration and high order aberration, and can reduce the total track length of the assembly.

In the aforementioned zoom lens assembly of the present invention, the lens material can be either glass or plastic. If the lens material is glass, it can increase the degree of freedom of refractive power distribution in the assembly. If the lens material is plastic, the production costs can be significantly lowered. Furthermore, plastic allows the making of aspheric surface on the lens. Aspheric surfaces can be easily made into non-spherical shapes to obtain more controlling factors of the lens, in order to eliminate aberrations, to reduce the number of lens elements used, and to effectively shorten the total track length of the zoom lens assembly of the present invention.

In the aforementioned zoom lens assembly of the present invention, if the lens surface is stated as convex, it means the lens surface near the optical axis is convex; if the lens surface is stated as concave, it means the lens surface near the optical axis is concave.

Preferred embodiments of the present invention will be described in the following paragraphs by referring to the accompanying drawings.

Figure 1A:
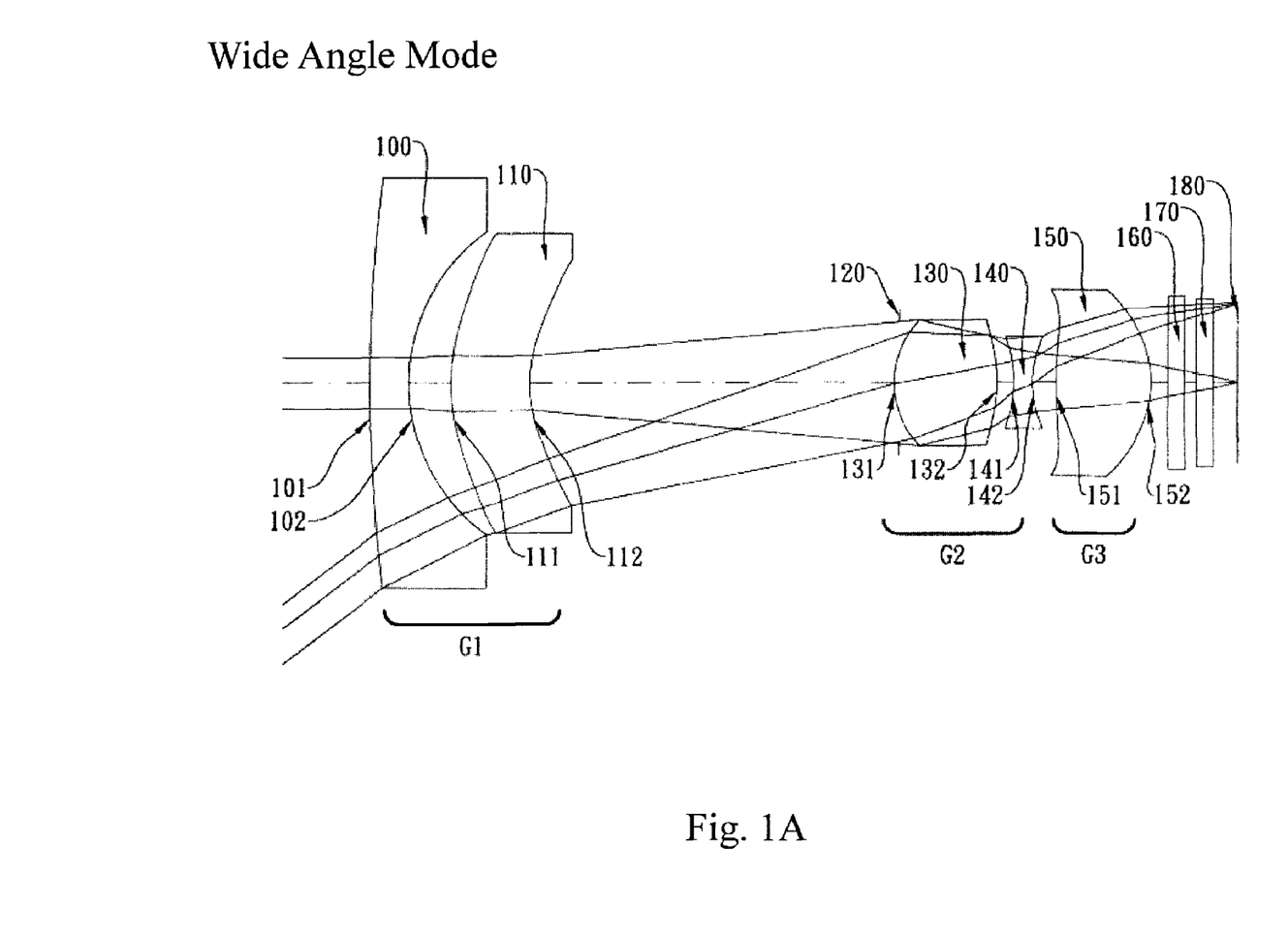
FIG. 1A shows a zoom lens assembly operating in wide angle mode in accordance with the first embodiment of the present invention.
Figure 1B:
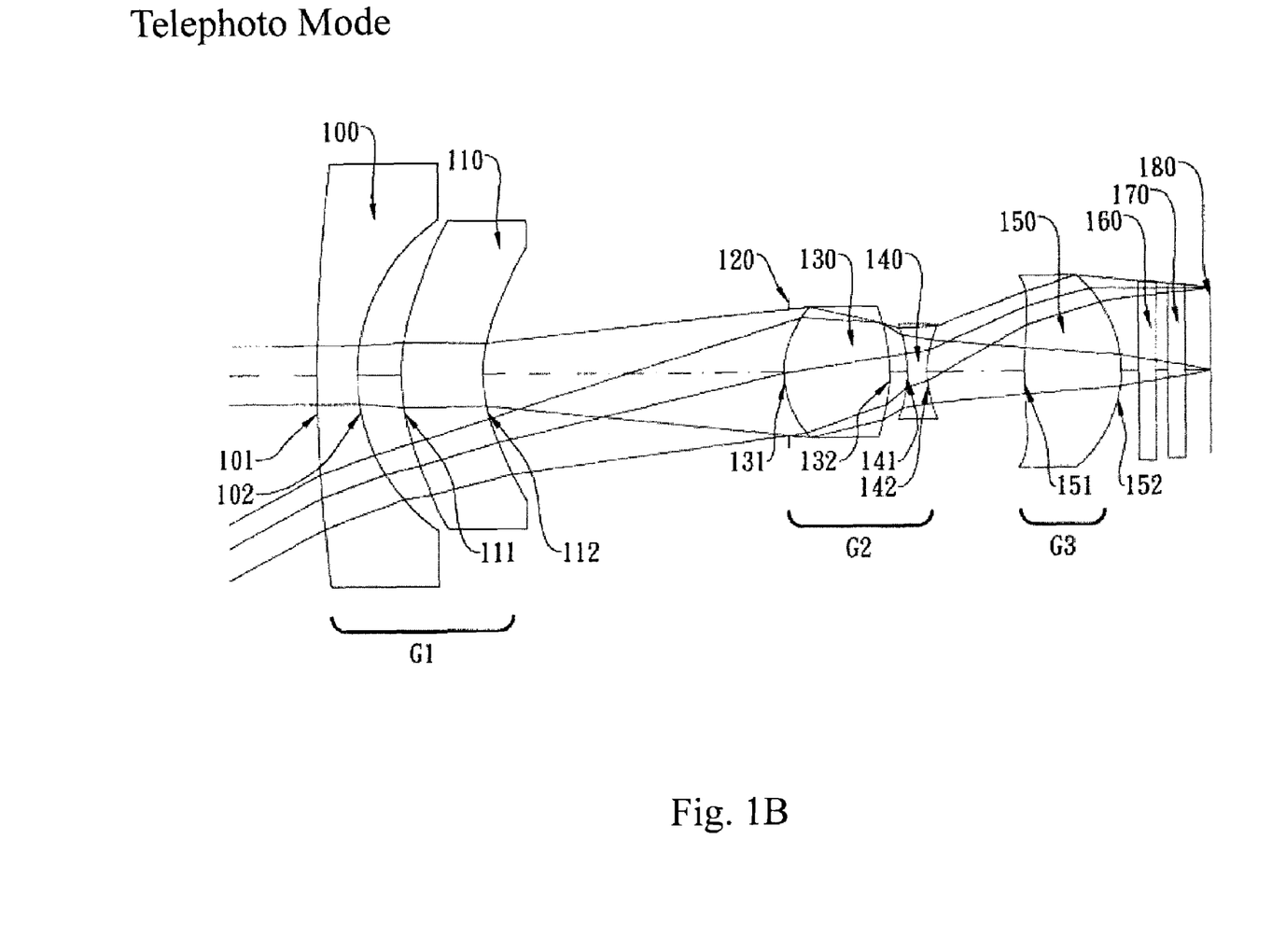
FIG. 1B shows a zoom lens assembly operating in telephoto mode in accordance with the first embodiment of the present invention.
Figure 2A:
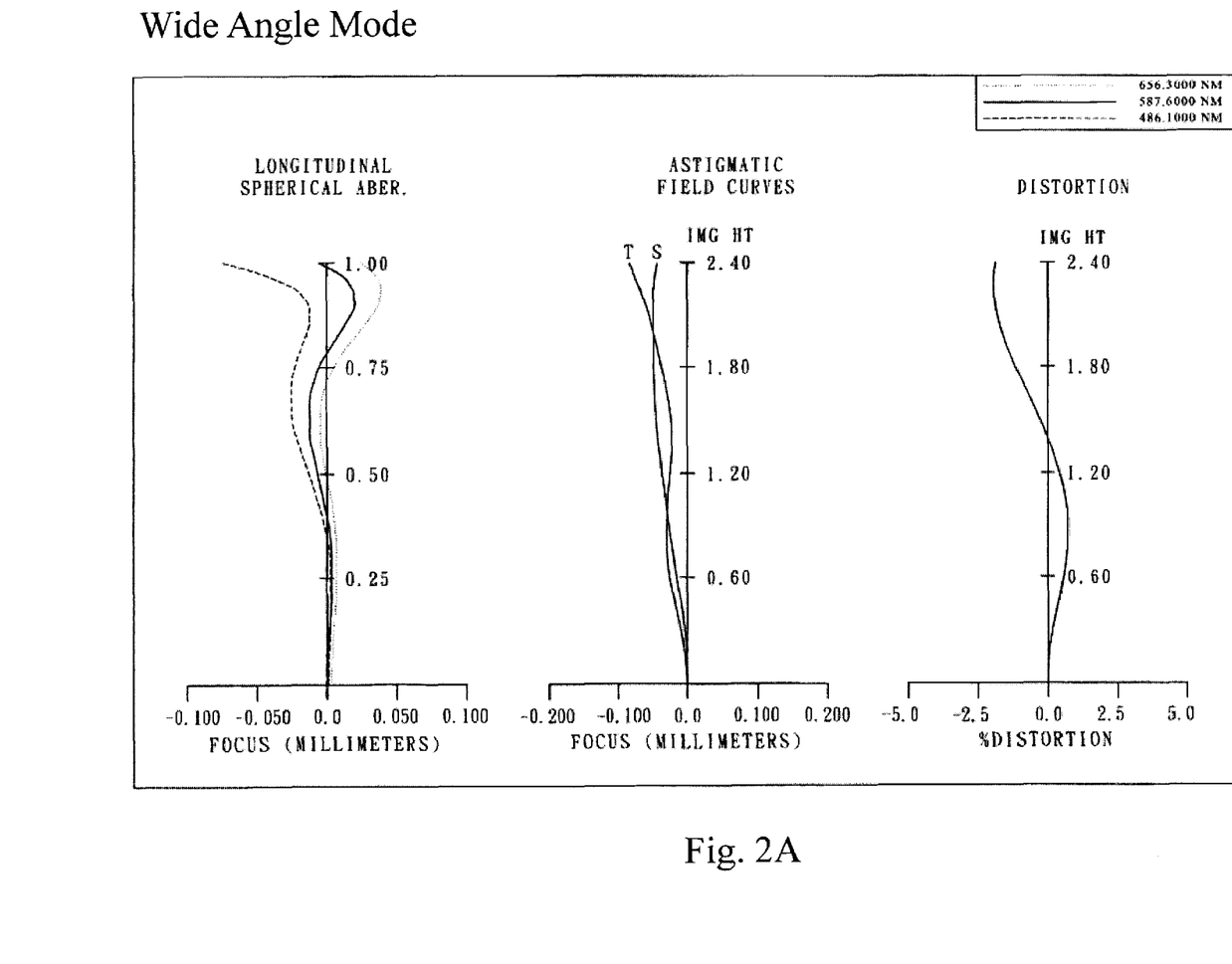
FIG. 2A shows a figure of aberration curves while operating in wide angle mode in accordance with the first embodiment of the present invention.
Figure 2B:
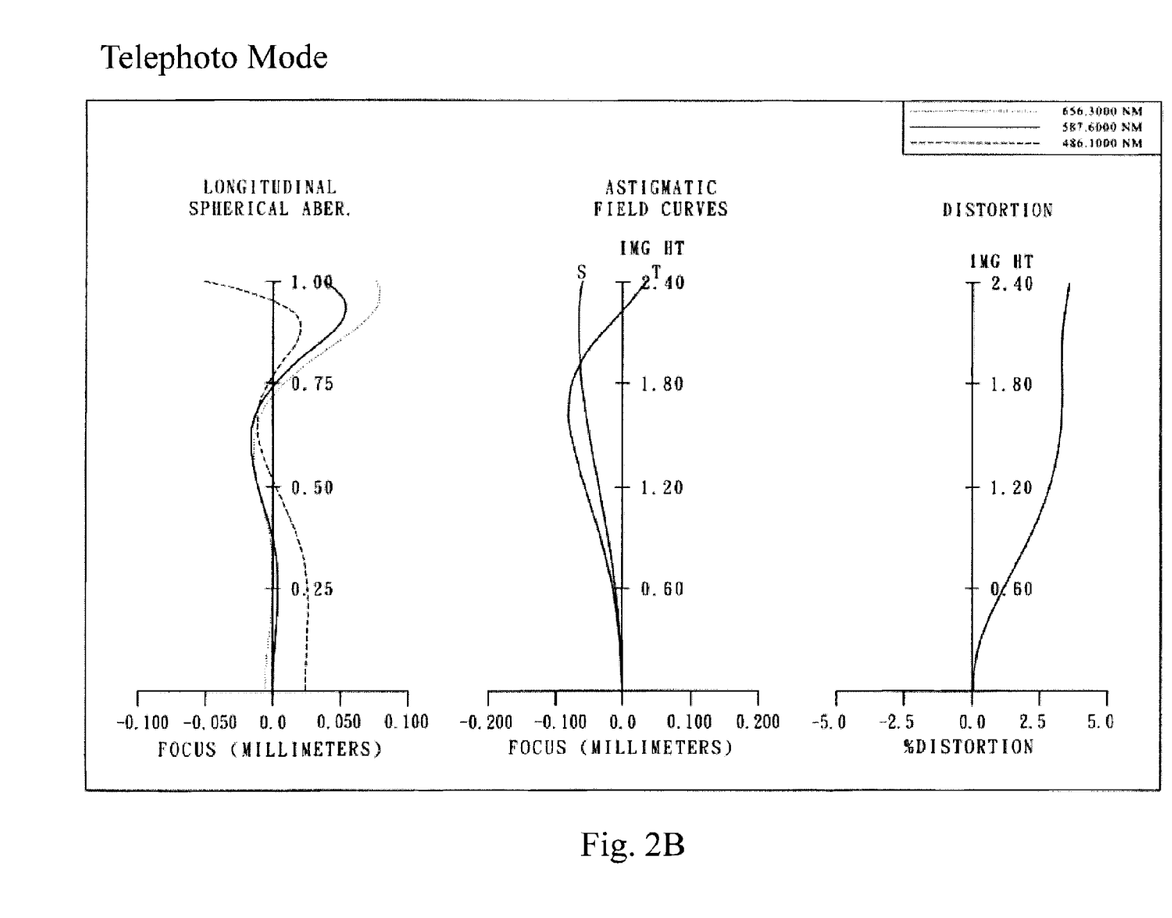
FIG. 2B shows a figure of aberration curves while operating in telephoto mode in accordance with the first embodiment of the present invention.

FIG. 1A and FIG. 1B show a zoom lens assembly operating in wide angle mode and in telephoto mode in accordance with a first embodiment of the present invention, and FIGS. 2A and 2B show the aberration curves in wide angle mode and in telephoto mode of the first embodiment of the present invention. The zoom lens assembly of the first embodiment of the present invention mainly comprises three lens groups, in order from the object side to the image side: a first lens group G1 with negative refractive power, a second lens group G2 with positive refractive power, and a third lens group G3 with positive refractive power. Through the movement of the second lens group G2 on the optical axis, in order to zoom between the wide angle mode and the telephoto mode, wherein:

The first lens group G1, having only two lens elements with refractive power, comprises in order from the object side to the image side:

A first lens element 100 with negative refractive power having a convex object-side surface 101 and a concave image-side surface 102, made of glass material; and A second lens element 110 with negative refractive power having a convex object-side surface 111 and a concave image-side surface 112, made of resin material, both object-side surface 111 and image-side surface 112 being aspheric;

Wherein the second lens group G2 comprises in order from the object-side to the image side:

A stop 120;

A third lens element 130 with positive refractive power, having both object-side surface 131 and image-side surface 132 convex, made of resin material, both object-side surface 131 and image-side surface 132 being aspheric; and A fourth lens element 140 with negative refractive power, having both object-side surface 141 and image-side surface 142 concave, made of resin material, both object-side surface 141 and image-side surface 142 being aspheric;

Wherein the third lens group G3 comprises:

A fifth lens element 150 with positive refractive power, having both object-side surface 151 and image-side surface 152 convex, made of resin material, both object-side surface 151 and image-side surface 152 being aspheric;

In addition, there is an IR-filter 160 disposed between the image-side surface 152 of the fifth lens element 150 and the image plane 180, and a cover-glass 170 is disposed between the IR-filter 160 and the image plane 180; the IR-filter 160 and the cover-glass 170 are made of glass material which would not affect the focal length of the zoom lens assembly of the present invention.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present zoom lens assembly, the focal length of the zoom lens assembly in wide angle mode is $f_W$, the focal length of the zoom lens assembly in telephoto mode is $f_T$, and they satisfy the relations: $f_W=3.18$ (mm), $ft=4.37$ (mm).

In the first embodiment of the present zoom lens assembly, the f-number of the zoom lens assembly in wide angle mode is $Fno_W$, the f-number of the zoom lens assembly in telephoto mode is $Fno_T$, and they satisfy the relations: $Fno_W=2.10$, $Fno_T=2.55$.

In the first embodiment of the present zoom lens assembly, half of the maximal field of view of the zoom lens assembly in wide angle mode is $HFOV_W$, half of the maximal field of view of the zoom lens assembly in wide angle mode is $HFOV_T$, and they satisfy the relations: $HFOV_W=37.6$ deg, $HFOV_T=27.9$ deg.

In the first embodiment of the present zoom lens assembly, the focal length of the zoom lens assembly in wide angle mode is $f_W$, the focal length of the second lens element 110 is f2, and they satisfy the relation: $f_W/f2=-0.08$.

In the first embodiment of the present zoom lens assembly, the focal length of the zoom lens assembly in wide angle mode is $f_W$, the focal length of the second lens group G2 is $f_{G2}$, and they satisfy the relation: $f_W/f_{G2}=0.47$.

In the first embodiment of the present zoom lens assembly, the focal length of the second lens group G2 is $f_{G2}$, the focal length of the third lens group G3 is $f_{G3}$, and they satisfy the relation: $f_{G2}/f_{G3}$=1.38.

In the first embodiment of the present zoom lens assembly, the focal length of the zoom lens assembly in wide angle mode is $f_W$, the focal length of the third lens element 130 is f3, and they satisfy the relation: $f_W/f3$=0.94.

In the first embodiment of the present zoom lens assembly, the Abbe number of the third lens element 130 is V3, the Abbe number of the fourth lens element 140 is V4, and they satisfy the relation: V3−V4=33.1, V4=23.4.

In the first embodiment of the present zoom lens assembly, the focal length of the zoom lens assembly in wide angle mode is $f_W$, the focal length of the third lens group G3 is $f_{G3}$, and they satisfy the relation: $f_W/f_{G3}$=0.65.

In the first embodiment of the present zoom lens assembly, the radius of curvature of the object-side surface of the fifth lens element 150 is R9, the radius of curvature of the image-side surface of the fifth lens element 150 is R10, and they satisfy the relation: R9/R10=−4.18.

In the first embodiment of the present zoom lens assembly, the total optical track length in wide angle mode is $TTL_W$, the maximum image height of the zoom lens assembly is ImgH, and they satisfy the relation: $TTL_W$/ImgH=10.8.

In the first embodiment of the present zoom lens assembly, the total optical track length in wide angle mode is $TTL_W$, the total optical track length in wide angle mode is $TTL_T$, and they satisfy the relation: $TTL_W/TTL_T$=1.0.

In the first embodiment of the present zoom lens assembly, the back focal length in wide angle mode is $BFL_W$, the back focal length in telephoto mode is $BFL_T$, and they satisfy the relation: $BFL_W/BFL_T$=1.0.

In the first embodiment of the present zoom lens assembly, the radius of curvature of the object-side surface of the third lens element 130 is R5, the radius of curvature of the image-side surface of the third lens element 130 is R6, and they satisfy the relation: R5/R6=−0.70.

Figure 5:
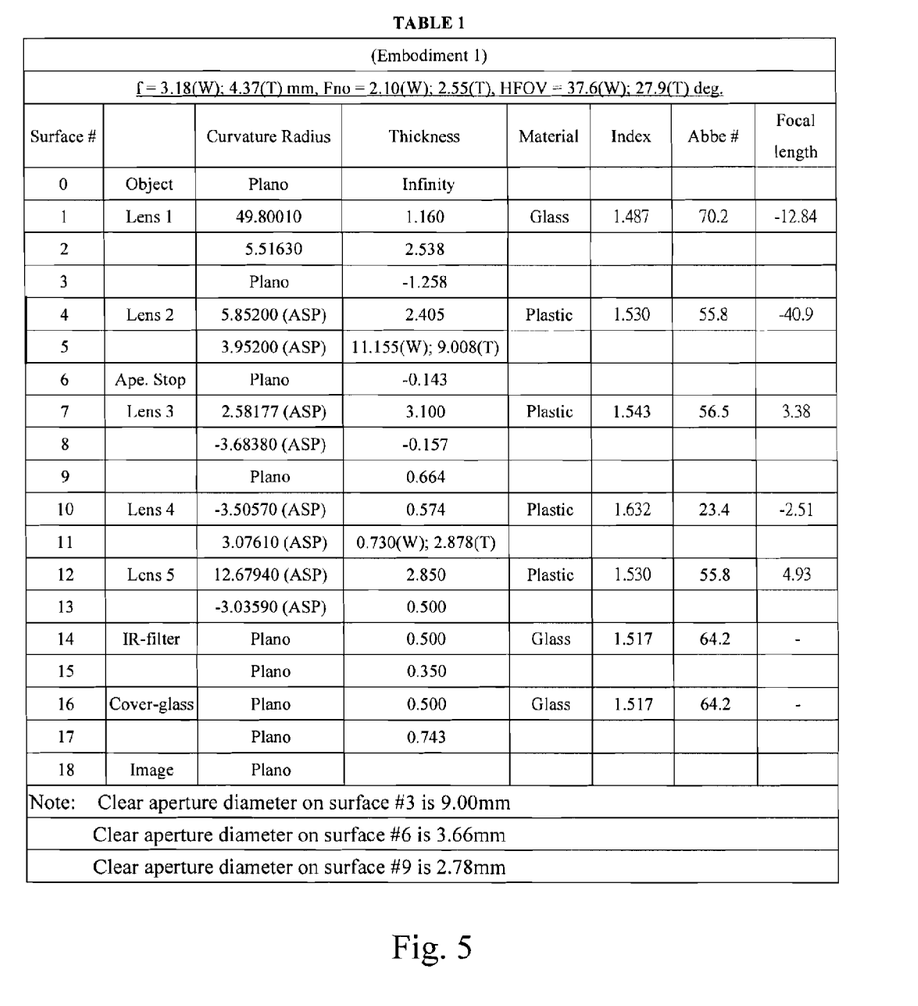
FIG. 5 is TABLE 1 which lists the optical data of the first embodiment.
Figure 6:
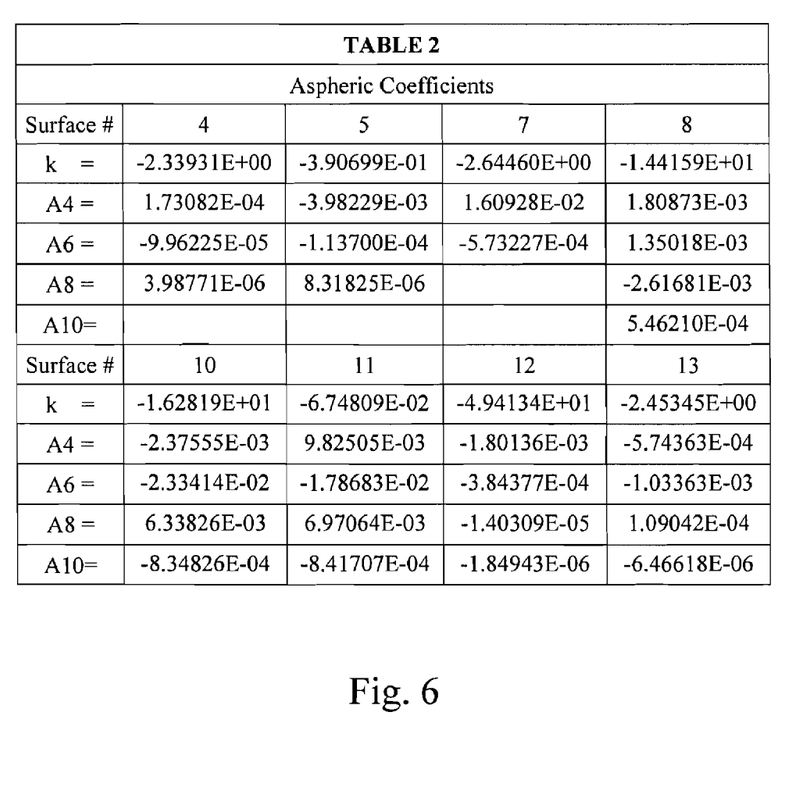
FIG. 6 is TABLE 2 which lists the aspheric surface data of the first embodiment.

The detailed optical data of the first embodiment is shown in FIG. 5 TABLE 1, and aspheric surface data is shown in FIG. 6 TABLE 2, wherein the units of the radius of curvature, lens thickness, and the focal length are expressed in mm. As shown while the zoom lens assembly in wide angle mode and in telephoto mode in FIG. 5 TABLE 1, the distances near the optical axis between the second lens element 110 and the stop 120 are 11.155 (mm) and 9.008 (mm) respectively, and the distances near the optical axis between the fourth lens element 140 and the fifth lens element 150 are 0.730 (mm) and 2.878 (mm); wherein the zoom lens assembly in wide angle mode and in telephoto mode, the focal lengths of the assembly are 3.18 (mm) and 4.37 (mm), the stop values are 2.10 and 2.55, and the half of the corresponding view angle are 37.6 and 27.9 degree, respectively.

Figure 3A:
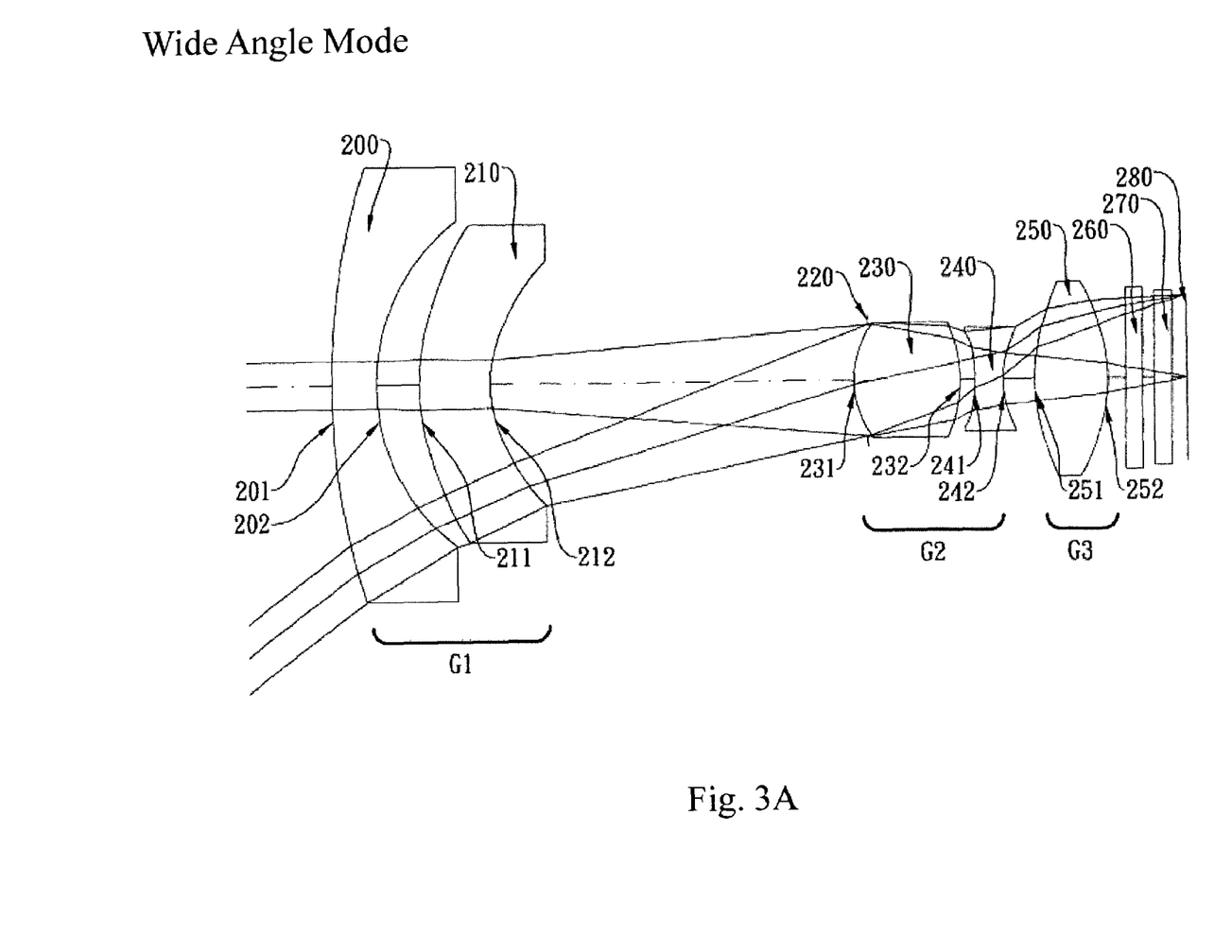
FIG. 3A shows a zoom lens assembly operating in wide angle mode in accordance with the second embodiment of the present invention.
Figure 3B:
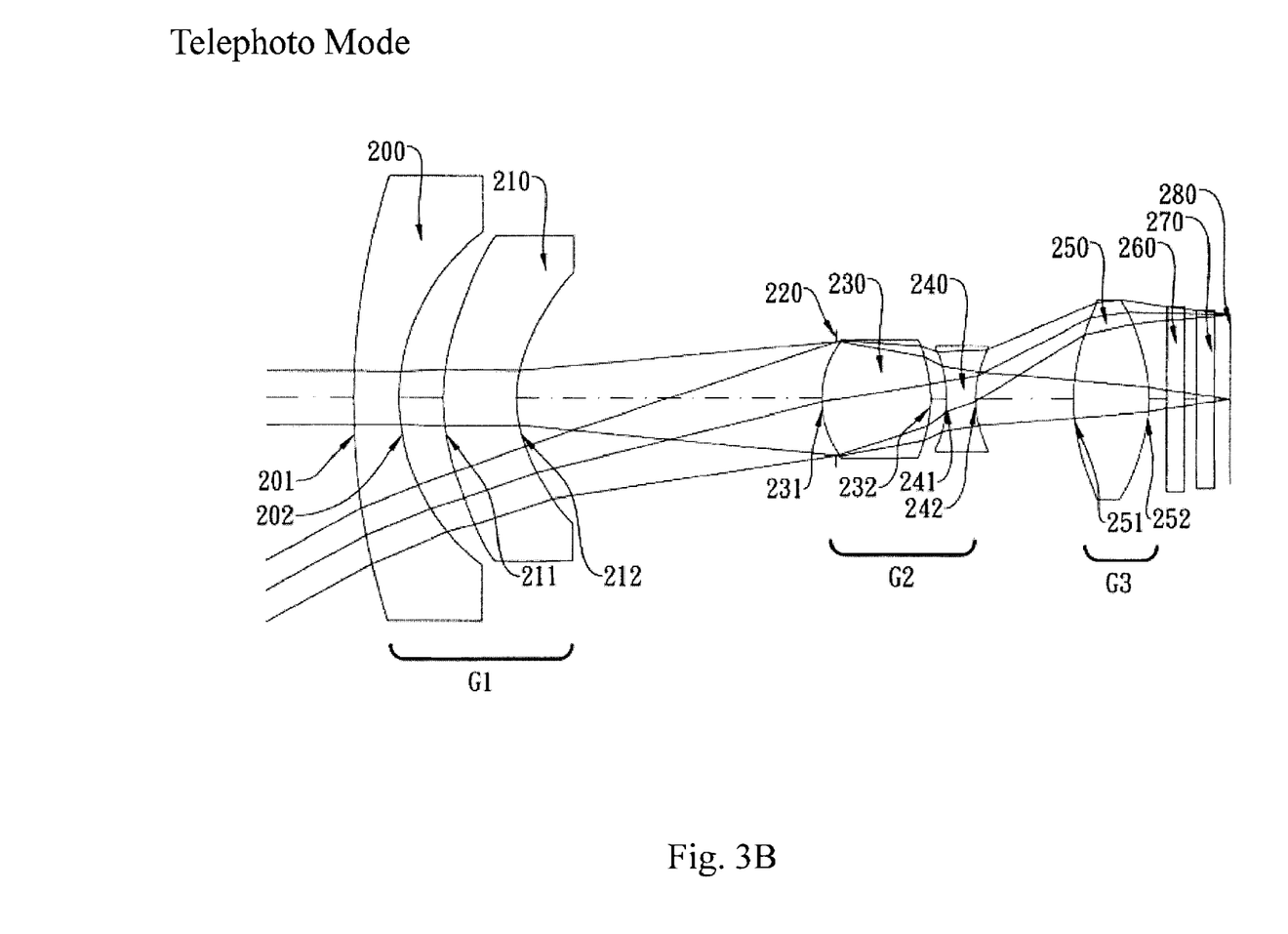
FIG. 3B shows a zoom lens assembly operating in telephoto mode in accordance with the second embodiment of the present invention.
Figure 4A:
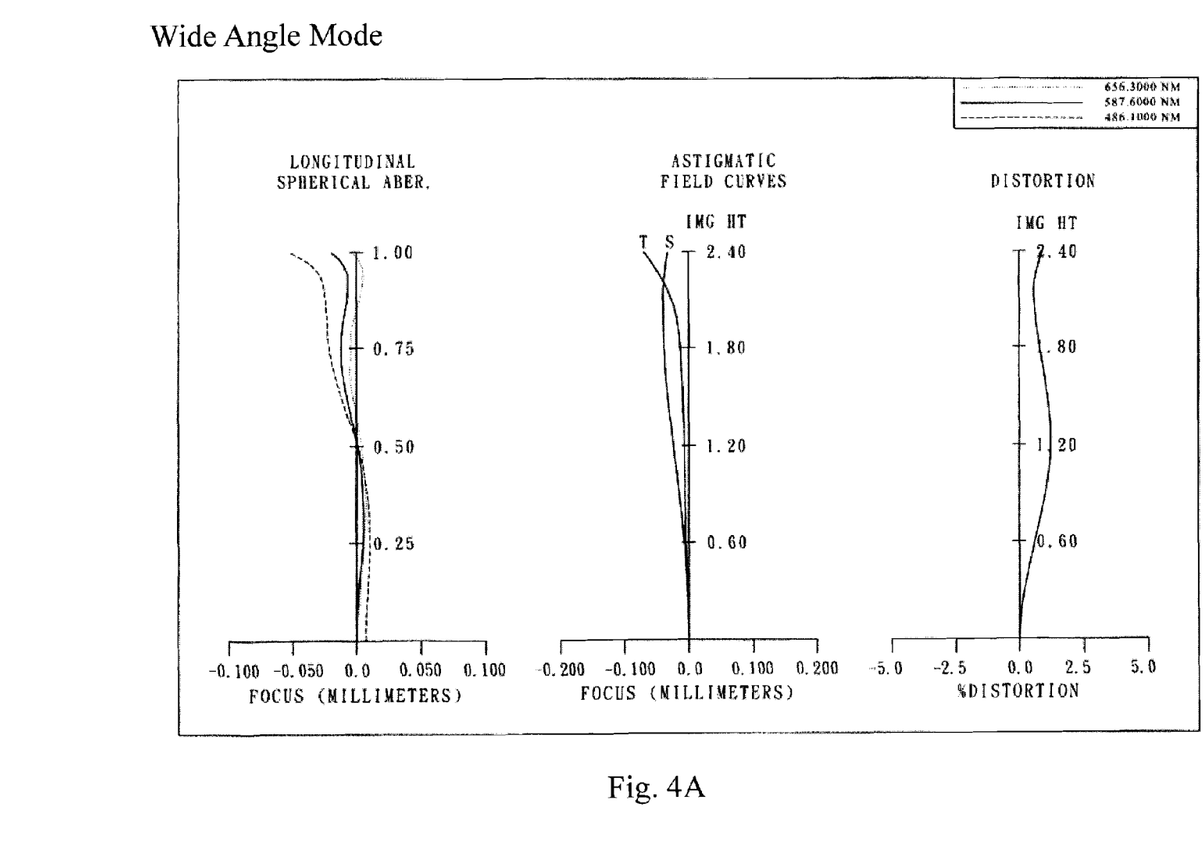
FIG. 4A shows a figure of aberration curves while operating in wide angle mode in accordance with a second embodiment of the present invention.
Figure 4B:
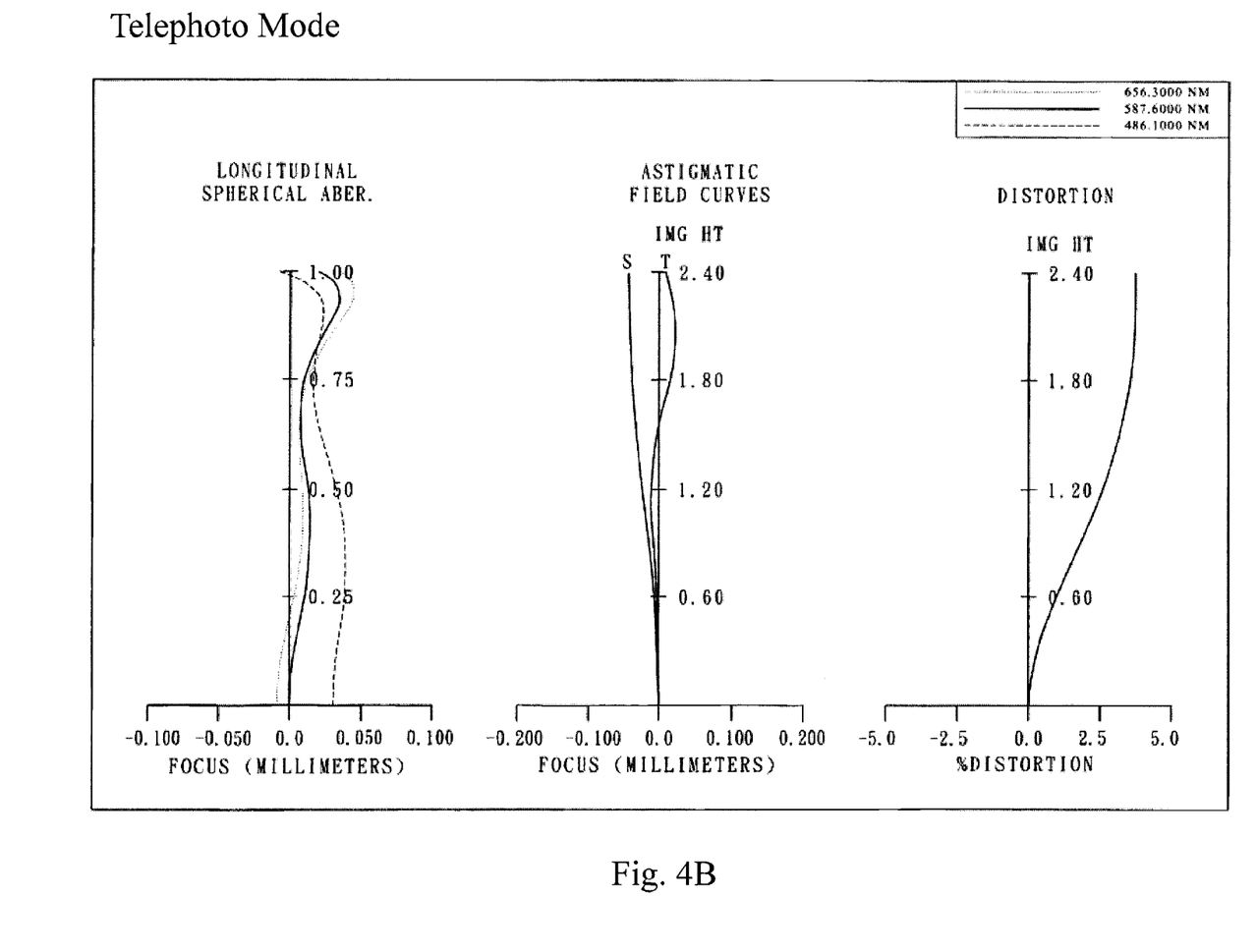
FIG. 4B shows a figure of aberration curves while operating in telephoto mode in accordance with the second embodiment of the present invention.

FIG. 3A and FIG. 3B show a zoom lens assembly operating in wide angle mode and in telephoto mode in accordance with a second embodiment of the present invention, and FIGS. 4A and 4B show the aberration curves in wide angle mode and in telephoto mode of the first embodiment of the present invention. The zoom lens assembly of the second embodiment of the present invention mainly comprises three lens groups, in order from the object side to the image side: a first lens group G1 with negative refractive power, a second lens group G2 with positive refractive power, and a third lens group G3 with positive refractive power. Through the movement of the second lens group G2 on the optical axis, in order to zoom between the wide angle mode and the telephoto mode, wherein:

The first lens group G1, having only two lens elements with refractive power, comprises, in order from the object side to the image side:

A first lens element 200 with negative refractive power having a convex object-side surface 201 and a concave image-side surface 202, made of glass material; and A second lens element 210 with negative refractive power having a convex object-side surface 211 and a concave image-side surface 212, made of resin material, both object-side surface 211 and image-side surface 212 being aspheric;

Wherein the second lens group G2 comprises in order from the object-side to the image side:

A stop 220;

A third lens element 230 with positive refractive power, having both object-side surface 231 and image-side surface 232 convex, made of resin material, both object-side surface 231 and image-side surface 232 being aspheric; and A fourth lens element 240 with negative refractive power, having both object-side surface 241 and image-side surface 242 concave, made of resin material, both object-side surface 241 and image-side surface 242 being aspheric;

Wherein the third lens group G3 comprises:

A fifth lens element 250 with positive refractive power, having both object-side surface 251 and image-side surface 252 convex, made of resin material, both object-side surface 251 and image-side surface 252 being aspheric;

In addition, there is an IR-filter 260 disposed between the image-side surface 252 of the fifth lens element 250 and the image plane 280, and a cover-glass 270 is disposed between the IR-filter 260 and the image plane 280; the IR-filter 260 and the cover-glass 270 are made of glass material which would not affect the focal length of the zoom lens assembly of the present invention.

The equation of the aspheric surface profiles of the second embodiment has the same form as that of the first embodiment.

In the second embodiment of the present zoom lens assembly, the focal length of the zoom lens assembly in wide angle mode is $f_W$, the focal length of the zoom lens assembly in telephoto mode is ft, and they satisfy the relations: $f_W$=3.20 (mm), ft=4.31 (mm).

In the second embodiment of the present zoom lens assembly, the f-number of the zoom lens assembly in wide angle mode is $Fno_W$, the f-number of the zoom lens assembly in telephoto mode is $Fno_T$, and they satisfy the relations: $Fno_W$=2.35, $Fno_T$=2.85.

In the second embodiment of the present zoom lens assembly, half of the maximal field of view of the zoom lens assembly in wide angle mode is $HFOV_W$, half of the maximal field of view of the zoom lens assembly in wide angle mode is $HFOV_T$, and they satisfy the relations: $HFOV_W$=36.6 deg, $HFOV_T$=28.3 deg.

In the second embodiment of the present zoom lens assembly, the focal length of the zoom lens assembly in wide angle mode is $f_W$, the focal length of the second lens element 210 is f2, and they satisfy the relation: $f_W/f2$=−0.15.

In the second embodiment of the present zoom lens assembly, the focal length of the zoom lens assembly in wide angle mode is $f_W$, the focal length of the second lens group G2 is $f_{G2}$, and they satisfy the relation: $f_W/f_{G2}$=0.49.

In the second embodiment of the present zoom lens assembly, the focal length of the second lens group G2 is $f_{G2}$, the focal length of the third lens group G3 is $f_{G3}$, and they satisfy the relation: $f_{G2}/f_{G3}$=1.35.

In the second embodiment of the present zoom lens assembly, the focal length of the zoom lens assembly in wide angle mode is $f_W$, the focal length of the third lens element 230 is f3, and they satisfy the relation: $f_W/f3=1.00$.

In the second embodiment of the present zoom lens assembly, the Abbe number of the third lens element 230 is V3, the Abbe number of the fourth lens element 240 is V4, and they satisfy the relation: V3−V4=33.1, V4=23.4.

In the second embodiment of the present zoom lens assembly, the focal length of the zoom lens assembly in wide angle mode is $f_W$, the focal length of the third lens group G3 is $f_{G3}$, and they satisfy the relation: $f_W/f_{G3}=0.66$.

In the second embodiment of the present zoom lens assembly, the radius of curvature of the object-side surface of the fifth lens element 250 is R9, the radius of curvature of the image-side surface of the fifth lens element 150 is R10, and they satisfy the relation: R9/R10=−1.42.

In the second embodiment of the present zoom lens assembly, the total optical track length in wide angle mode is $TTL_W$, the maximum image height of the zoom lens assembly is ImgH, and they satisfy the relation: $TTL_W/ImgH=10.3$.

In the second embodiment of the present zoom lens assembly, the total optical track length in wide angle mode is $TTL_W$, the total optical track length in wide angle mode is $TTL_T$, and they satisfy the relation: $TTL_W/TTL_T=1.0$.

In the second embodiment of the present zoom lens assembly, the back focal length in wide angle mode is $BFL_W$, the back focal length in telephoto mode is $BFL_T$, and they satisfy the relation: $BFL_W/BFL_T=1.0$.

In the second embodiment of the present zoom lens assembly, the radius of curvature of the object-side surface of the third lens element 230 is R5, the radius of curvature of the image-side surface of the third lens element 230 is R6, and they satisfy the relation: R5/R6=−0.89.

Figure 7:
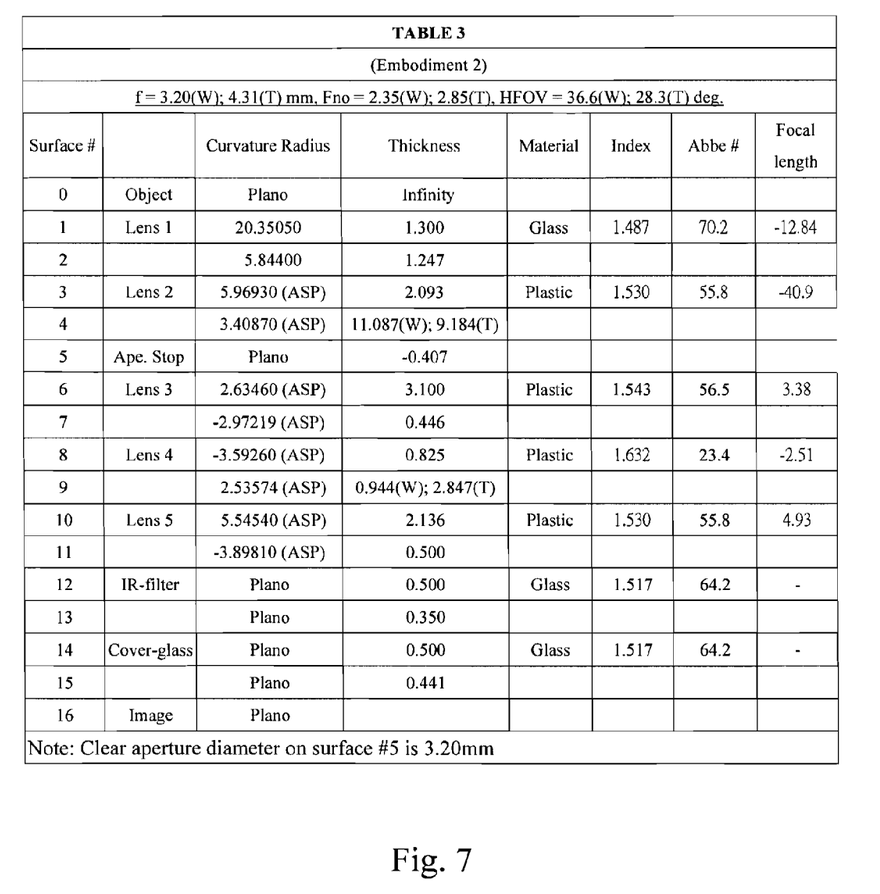
FIG. 7 is TABLE 3 which lists the optical data of the second embodiment.
Figure 8:
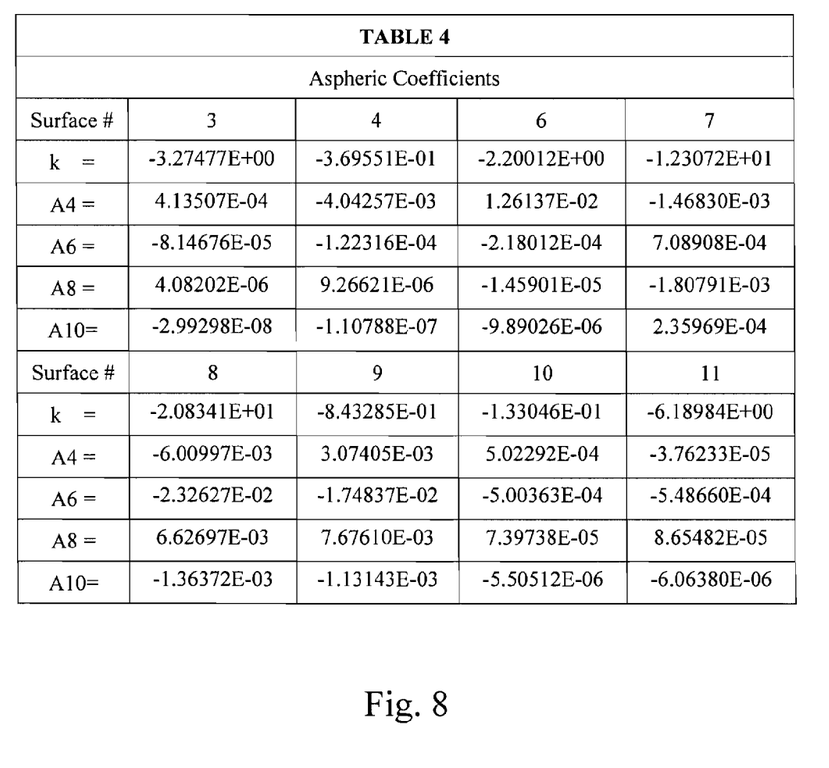
FIG. 8 is TABLE 4 which lists the aspheric surface data of the second embodiment.

The detailed optical data of the second embodiment is shown in FIG. 7 TABLE 3, and aspheric surface data is shown in FIG. 8 TABLE 4, wherein the units of the radius of curvature, lens thickness, and the focal length are expressed in mm. As shown while the zoom lens assembly in wide angle mode and in telephoto mode in FIG. 7 TABLE 3, the distances near the optical axis between the second lens element 210 and the stop 220 are 11.087 (mm) and 9.184 (mm) respectively, and the distances near the optical axis between the fourth lens element 240 and the fifth lens element 250 are 0.944 (mm) and 2.847 (mm); wherein the zoom lens assembly in wide angle mode and in telephoto mode, the focal lengths of the assembly are 3.20 (mm) and 4.31 (mm), the stop values are 2.35 and 2.85, and the half of the corresponding view angle are 36.6 and 28.3 degree, respectively.

Figure 9:
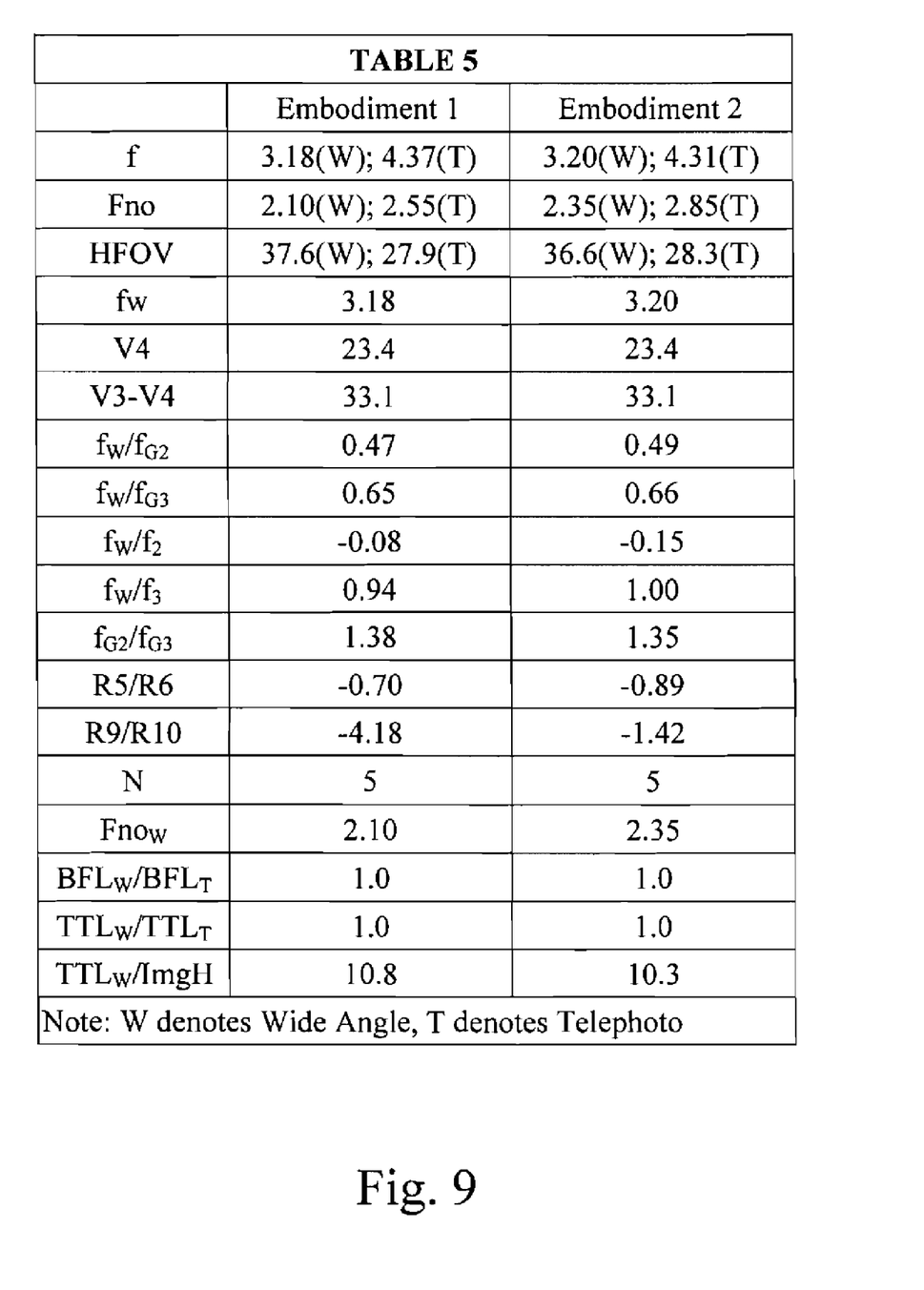
FIG. 9 is TABLE 5 which lists the data of the first and the second embodiments resulting from the equations.

It is to be noted that TABLES 1-4 (illustrated in FIGS. 5-8 respectively) show different data of the different embodiments, however, the data of the different embodiments are obtained from experiments. Therefore, any lens assembly of the same structure is considered to be within the scope of the present invention even if it uses different data. The embodiments depicted above and the appended drawings are exemplary and are not intended to limit the claim scope of the present invention. TABLE 5 (illustrated in FIG. 9) shows the data of the respective embodiments resulting from the equations.

What is claimed is:

1. A zoom lens assembly comprising, in order from an object side to an image side: a first lens group with negative refractive power, a second lens group with positive refractive power, and a third lens group with positive refractive power, wherein:
the first lens group having only two lens elements with refractive power, comprises, in order from the object side to the image side:
a first lens element with negative refractive power; and
a second lens element with negative refractive power;
the second lens group comprises, in order from the object side to the image side:
a stop;
a third lens element; and
a fourth lens element;
the third lens group comprises:
a fifth lens element; wherein
the number of lens elements with refractive power of the zoom lens assembly is N, and it satisfies the relation: $5 \leq N \leq 7$, wherein there are at least three aspheric lens elements of the lens elements with refractive power of the zoom lens assembly.

2. The zoom lens assembly according to claim 1, wherein the third lens element has positive refractive power and the fourth lens element has negative refractive power.

3. The zoom lens assembly according to claim 2, wherein the zoom lens assembly achieves zooming through movement on the optical axis of the second lens group between wide angle end and telephoto end.

4. The zoom lens assembly according to claim 3, wherein the first lens element has a convex object side surface, a concave image side surface, and the second lens element has a convex object side surface, a concave image side surface.

5. The zoom lens assembly according to claim 4, wherein the second lens group comprises at least one aspheric lens element made of resin material.

6. The zoom lens assembly according to claim 5, wherein the second lens group has only two lens elements with refractive power, and both the object side surface and the image side surface of the third lens element are convex.

7. The zoom lens assembly according to claim 6, wherein the second lens element is made of resin, the focal length of the zoom lens assembly in wide angle mode is $f_W$, the focal length of the second lens element is f2, and they satisfy the relation: $-0.30 < f_W/f2 < -0.03$.

8. The zoom lens assembly according to claim 7, wherein the focal length of the zoom lens assembly in wide angle mode is $f_W$, the focal length of the second lens group is $f_{G2}$, and they satisfy the relation: $0.35 < f_W/f_{G2} < 0.65$.

9. The zoom lens assembly according to claim 8, wherein both the object side surface and the image side surface of the fourth lens element are concave.

10. The zoom lens assembly according to claim 9, wherein the focal length of the second lens group is $f_{G2}$, the focal length of the third lens group is $f_{G3}$, and they satisfy the relation: $0.90 < f_{G2}/f_{G3} < 1.50$.

11. The zoom lens assembly according to claim 10, wherein the focal length of the second lens group is $f_{G2}$, the focal length of the third lens group is $f_{G3}$, and they satisfy the relation: $1.20 < f_{G2}/f_{G3} < 1.50$.

12. The zoom lens assembly according to claim 8, wherein the focal length of the zoom lens assembly in wide angle mode is $f_W$, the focal length of the third lens element is f3, and they satisfy the relation: $0.80 < f_W/f3 < 1.10$.

13. The zoom lens assembly according to claim 7, wherein the Abbe number of the third lens element is V3, the Abbe number of the fourth lens element is V4, and they satisfy the relation: $30.5 < V3-V4 < 42.0$; $V4 < 25.0$.

14. The zoom lens assembly according to claim 10, wherein the focal length of the zoom lens assembly in wide angle mode is $f_W$, the focal length of the third lens group is $f_{G3}$, and they satisfy the relation: $0.55 < f_W/f_{G3} < 0.75$.

15. The zoom lens assembly according to claim 14, wherein the fifth lens element is the only lens element with refractive power in the third lens group, the radius of curvature on the object side surface of the fifth lens element is R9, the radius of curvature on the image side surface of the fifth lens element is R10, and they satisfy the relation: $-6.0 < R9/R10 < -1.2$.

16. The zoom lens assembly according to claim 7, wherein the total optical track length of the zoom lens assembly in wide angle mode is $TTL_W$, the maximum image height of the zoom lens assembly is ImgH, and they satisfy the relation: $TTL_W/ImgH<12.0$.

17. The zoom lens assembly according to claim 5, wherein the total optical track length of the zoom lens assembly in wide angle mode is $TTL_W$, the total optical track length of the zoom lens assembly in telephoto mode is $TTL_T$, the back focal length of the zoom lens assembly in wide angle mode is $BFL_W$, the back focal length of the zoom lens assembly in telephoto mode is $BFL_T$, and they satisfy the relations:

$0.99<TTL_W/TTL_T<1.01$;

$0.99<BFL_W/BFL_T<1.01$.

18. The zoom lens assembly according to claim 7, wherein the f-number of the zoom lens assembly in wide angle mode is $Fno_W$, and it satisfies the relation: $1.60<Fno_W<2.40$.

19. The zoom lens assembly according to claim 9, wherein the focal length of the zoom lens assembly in wide angle mode is $f_W$, the focal length of the second lens element is f2, and they satisfy the relation: $-0.18<f_W/f2<-0.06$.

20. The zoom lens assembly according to claim 13, wherein the radius of curvature on the object side surface of the third lens element is R5, the radius of curvature on the image side surface of the third lens element is R6, and they satisfy the relation: $-1.0<R5/R6<-0.60$.

* * * * *